US007881363B2

(12) United States Patent
Chuang

(10) Patent No.: US 7,881,363 B2
(45) Date of Patent: Feb. 1, 2011

(54) DATA TRANSMISSION RATE ADJUSTMENT SYSTEM AND METHOD THEREOF

(75) Inventor: Chung-Hsien Chuang, Sanchong (TW)

(73) Assignee: Mitac International Corp., Taoyuan (TW)

( * ) Notice: Subject to any disclaimer, the term of this patent is extended or adjusted under 35 U.S.C. 154(b) by 700 days.

(21) Appl. No.: 11/902,768

(22) Filed: Sep. 26, 2007

(65) Prior Publication Data

US 2009/0034593 A1 Feb. 5, 2009

(30) Foreign Application Priority Data

Aug. 5, 2007 (TW) .............................. 96116328 A

(51) Int. Cl.
*H04B 3/46* (2006.01)
*H04B 1/38* (2006.01)

(52) U.S. Cl. ....................................... 375/225; 375/222

(58) Field of Classification Search ................. 375/222, 375/219; 725/111
See application file for complete search history.

(56) References Cited

U.S. PATENT DOCUMENTS 6,970,525 B1 * 11/2005 Kljajic et al. ............... 375/354
2003/0016797 A1 * 1/2003 Zakrzewski et al. ...... 379/93.32
2003/0231655 A1 12/2003 Kelton et al.
2005/0207360 A1 9/2005 Costo et al.

FOREIGN PATENT DOCUMENTS

TW I266509 11/2006

* cited by examiner

*Primary Examiner*—David C Payne
*Assistant Examiner*—Brian J Stevens
(74) *Attorney, Agent, or Firm*—Wang Law Firm; Li K. Wang

(57) ABSTRACT

A data transmission rate adjustment system and method thereof comprise a driving module and a control module. The driving module performs a predetermined mathematical calculation based on a transmission rate request to generate a divisor. The control module then performs a division that divides a reference frequency by the divisor to generate a first transmission rate so that a data receiving terminal can receive data sent from a data sending terminal through the driving module based on the first transmission rate. The driving module monitors a transmission error rate of the data received by the data receiving terminal. If the transmission error rate exceeds a predetermined value, the divisor is automatically adjusted to generate a second transmission rate. The second transmission rate is also provided to replace the first transmission rate.

13 Claims, 4 Drawing Sheets

DATA TRANSMISSION RATE ADJUSTMENT SYSTEM AND METHOD THEREOF

FIELD OF THE INVENTION

The invention relates to a data transmission rate adjustment system and method thereof, more particularly to an apparatus and method for reducing transmission error rate by adjusting data transmission rate.

BACKGROUND OF THE INVENTION

Generally speaking, while a data sending terminal transmits a data to a data receiving terminal, the transmission rate of these terminals has better to be the same for making sure the success of transmission. The universal asynchronous receiver transmitter, abbreviated UART, is the most common transmission interface used in the embedded system, the unit of the transmission rate defined in the protocol of the UART is represented by the baud rate which means the bits transmitted per second. The common used baud rate of the asynchronous receiver transmitter comprises 1200, 2400, 4800, 9600 and 19200, etc. For correct transmission, the transmission between the data sending terminal and the data receiving terminal should be in the same baud rate. The transmission rate is usually generated by dividing a reference frequency by a divisor. There are different divisors corresponding to different transmission rates respectively.

However, the difference of mathematical calculations for the above division by the respective manufacturers, such as rounding up or down of the division, often result in the inaccuracy of transmission rate. Therefore, even if the data transmitting apparatuses which come from different manufacturers are set the same baud rate, the differences of the actual transmission rates among the data transmitting apparatuses still exists, so the frame error often occurs during data transmission and it reduces the transmission efficiency. The problem mentioned above becomes more serious when the baud rate is set to be higher.

In view of the shortcomings of the prior art, the inventor of the present invention based on years of experience in the related industry to develop a data transmission rate adjustment system and its method to overcome the shortcomings of the prior art.

SUMMARY OF THE INVENTION

To solve the drawback mentioned above, a data transmission rate adjustment system and method thereof is disclosed. The present invention provides an apparatus and method for reducing the transmission error rate of the data transmission by adjusting the data transmission rate.

The data transmission rate adjustment system in accordance with the present invention comprises a driving module and a control module. The driving module performs a predetermined calculation based on a transmission rate request to generate a divisor. The control module is applied to divide a reference frequency by the divisor to generate a first transmission rate so that a data receiving terminal can receive data sent from a data sending terminal through the driving module based on the first transmission rate. Wherein, the driving module monitors a transmission error rate of the data received by the data receiving terminal, and if the transmission error rate exceeds a predetermined value, the driving module adjusts the divisor and the control module generates a second transmission rate by dividing the reference frequency by the adjusted divisor. Then, the data receiving terminal receives data based on the second transmission rate.

As is mentioned above, the data transmission rate adjustment system and method in accordance with the present invention monitors the data transmission status between the data sending terminal and the data receiving terminal by a driving module. If the transmission error rate exceeds a predetermined value, the divisor is automatically adjusted for change the transmission rate to match the transmission rate request of the data sending terminal. Therefore, the transmission error rate could be reduced effectively. Meanwhile, the data receiving terminal can dynamically adjust the transmission rate to match the different data sending terminals for achieving better data transmission efficiency.

DETAILED DESCRIPTION OF THE PREFERRED EMBODIMENTS

To make it easier for our examiner to understand the objective of the present invention, its structure, innovative features, and performance, we use preferred embodiments together with the attached drawings for the detailed description of the invention.

Figure 1:
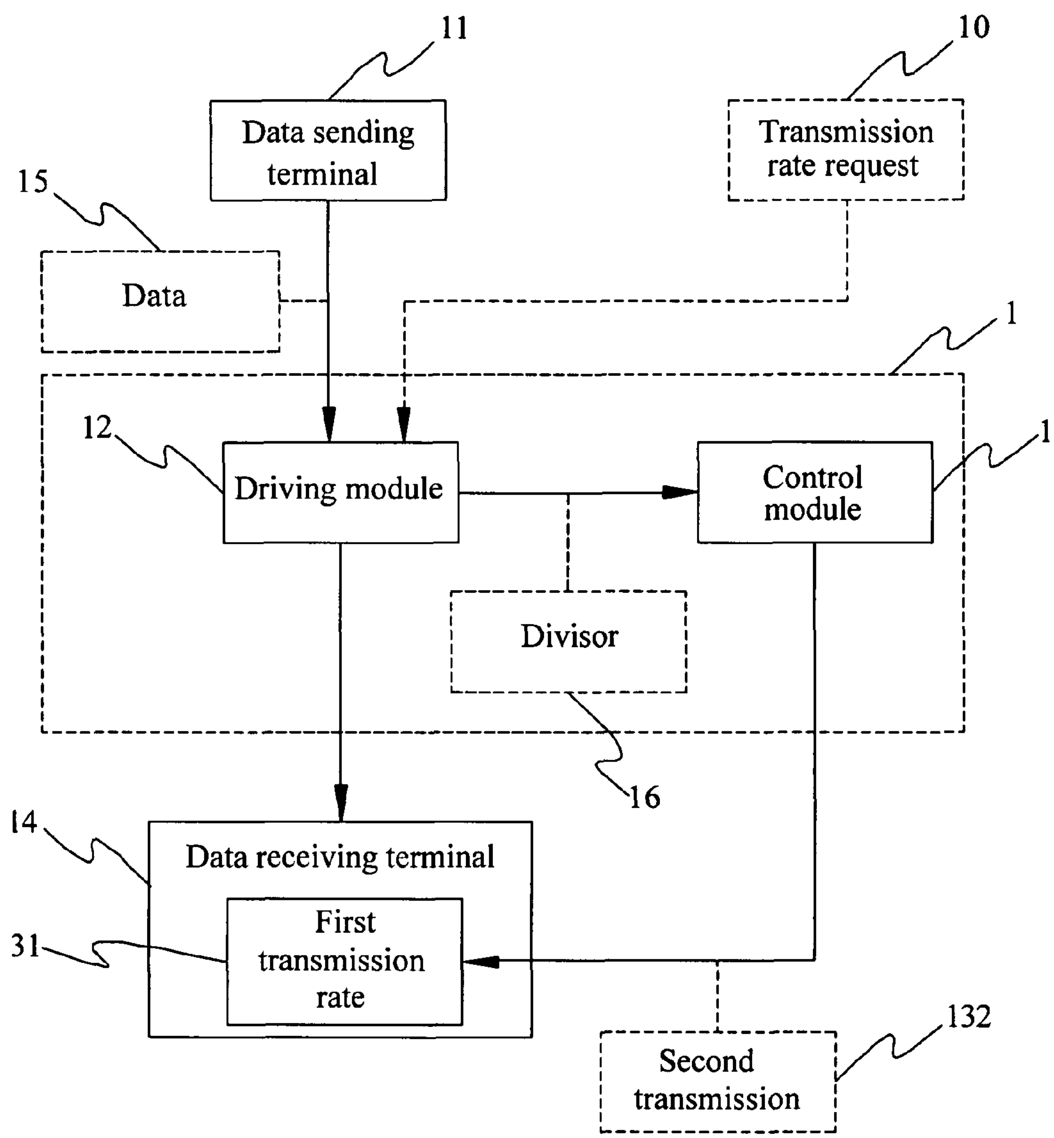
FIG. 1 is the schematic block diagram of the data transmission rate adjustment system in accordance with the invention.

Please referring to FIG. 1 for the block diagram of the data transmission rate adjustment system in accordance with the invention, the data transmission rate adjustment system 1 comprises a driving module 12 and a control module 13. The driving module 12 performs a predetermined calculation based on a transmission rate request 10 to generate a divisor 16, the control module 13 is applied to divide a reference frequency by the divisor 16 to generate a first transmission rate 131 so that a data receiving terminal 14 can receive data sent from a data sending terminal 11 through the driving module 12 based on the first transmission rate 131.

The driving module 12 also monitors a transmission error rate of the data 15 received by the data receiving terminal 14, and if the transmission error rate exceeds a predetermined value, the driving module 12 adjusts the divisor 16 and the control module 13 generates a second transmission rate 132 based on the adjusted divisor. The second transmission rate 132 is provided to the data receiving terminal 14 for replacing the first transmission rate 131.

The reference frequency mentioned above is provided by a CPU. The unit of the first transmission rate and the second transmission rate mentioned above is a baud rate. Preferably, the data receiving terminal mentioned above apply an interface, such as a universal asynchronous receiver transmitter, a universal serial bus, a wireless network transmission interface or any kind of transmission interfaces, to receive data. Preferably, the control module mentioned above can be an UART controller, and the control module more comprises a status register for storing the operating status of the control module.

The driving module checks the data stored in the status register repeatedly for monitoring the transmission error rate of the data received in the data receiving terminal. Preferably, the control module mentioned above further comprises a divisor register for storing the divisor provided by the driving module. The control module can use the divisor for executing the calculation. The transmission error rate mentioned above means the occurred rate of the frame error in the received data frame.

Figure 2:
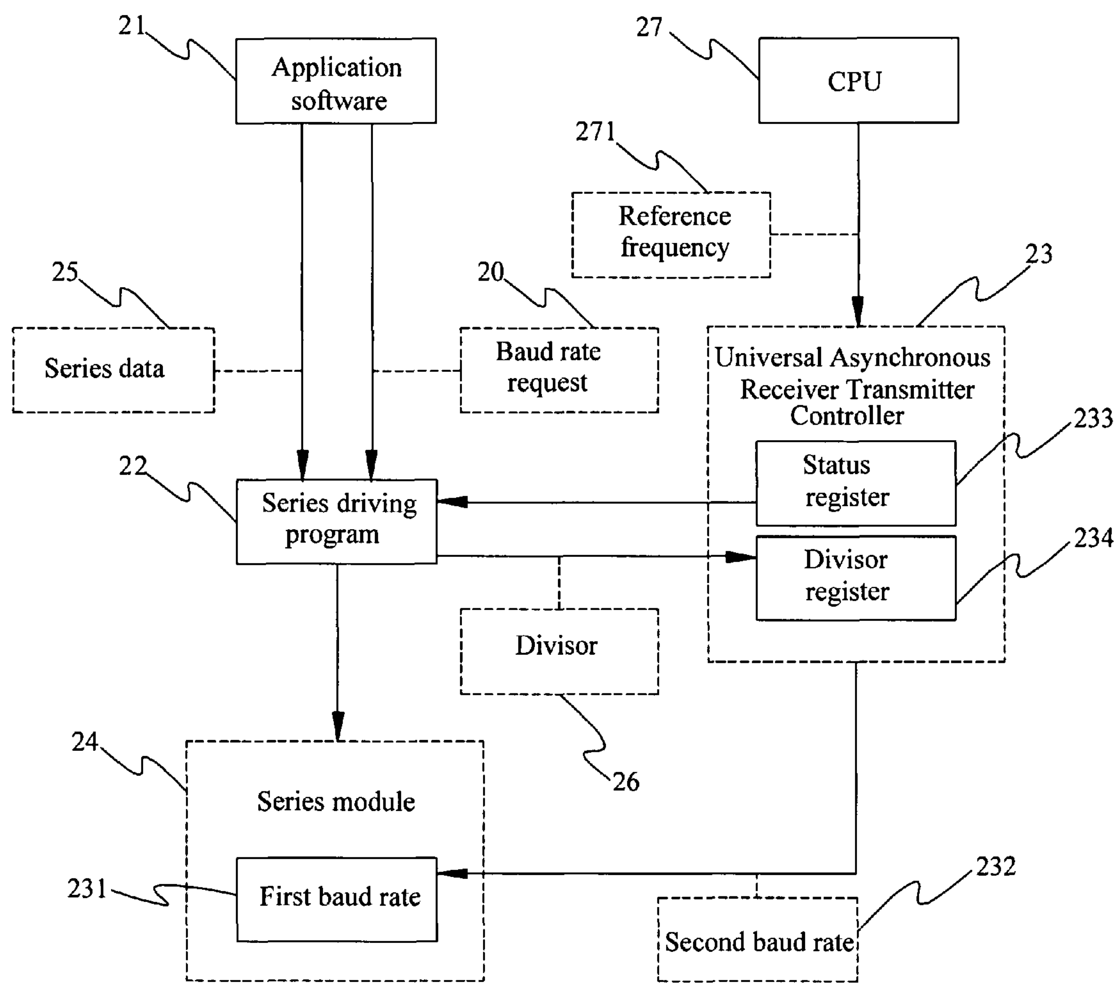
FIG. 2 is the schematic block diagram of an embodiment of the data transmission rate adjustment system in accordance with the invention.

Please referring to FIG. 2 for the block diagram of an embodiment of the data transmission rate adjustment system in accordance with the present invention, the data transmission rate adjustment system comprises a serial driving program 22, a serial module 24 and a UART controller 23, the application software 21 is applied to send out an desired baud rate request 20. After receiving the baud rate request 20, the serial driving program 22 performs a predetermined calculation to generate a divisor 26 based on the baud rate requested by the application software 21.

The divisor 26 is then sent to the divisor register 234 in the UART controller 23 for storing. The UART controller 23 divides a reference frequency 271 by the divisor 26 to generate a first baud rate 231. Based on the first baud rate 231, the serial module 24 receives the serial data 25 sent from the application software 21 through the serial driving program 22. Wherein, the serial driving program 22 monitors the occurred rate of the frame error in the serial data 25 by check in data stored in the status register 233 of the UART controller 23 while the serial module 24 is receiving the serial data 25. If the occurred rate of the frame error mentioned above exceeds a predetermined value, the serial driving program 22 will dynamically adjust the divisor 26 and the UART controller 23 will generate a second baud rate 232 based on the adjusted divisor. The second baud rate 232 is closer to the transmission baud rate desired by the application software 21 than the first baud rate 231. The second baud rate 232 is provided to the serial module 24 for replacing the first baud rate 231.

When the application software 21 desires to use a 4800 bps baud rate to communicate with the serial module 24 at the button layer of the protocol, the related request is sent to the serial driving program 22 for notification. Meanwhile, the serial driving program 22 calculates the divisor 26 by the mathematical formula. In other words, the serial driving program 22 uses a frequency divider-by-16 to generate the divisor 26. Therefore, if the reference frequency 271 is 928 kHz and the desired baud rate is 4800 bps, the predetermined value of the divisor 26 is 192, but the actual generated baud rate is 4836 bps. It is very obvious that there exists inaccuracy between the requested baud rate and the actual baud rate. Once the inaccuracy becomes larger than the range that the UART can tolerance, many frame errors will occur during the transmission.

The serial driving program 22 also monitors the frame error rate. Once the frame error rate exceeds a predetermined value, the divisor 26 is adjusted automatically. When it comes to the instance mentioned above, if the value of the divisor 26 is adjusted from 192 to 193, the actual baud rate generated by the UART controller 23 will become 4811 bps. And it is much closer to the transmission baud rate requested by the application software 21. The frame error rate can be also reduced thereby.

Figure 3:
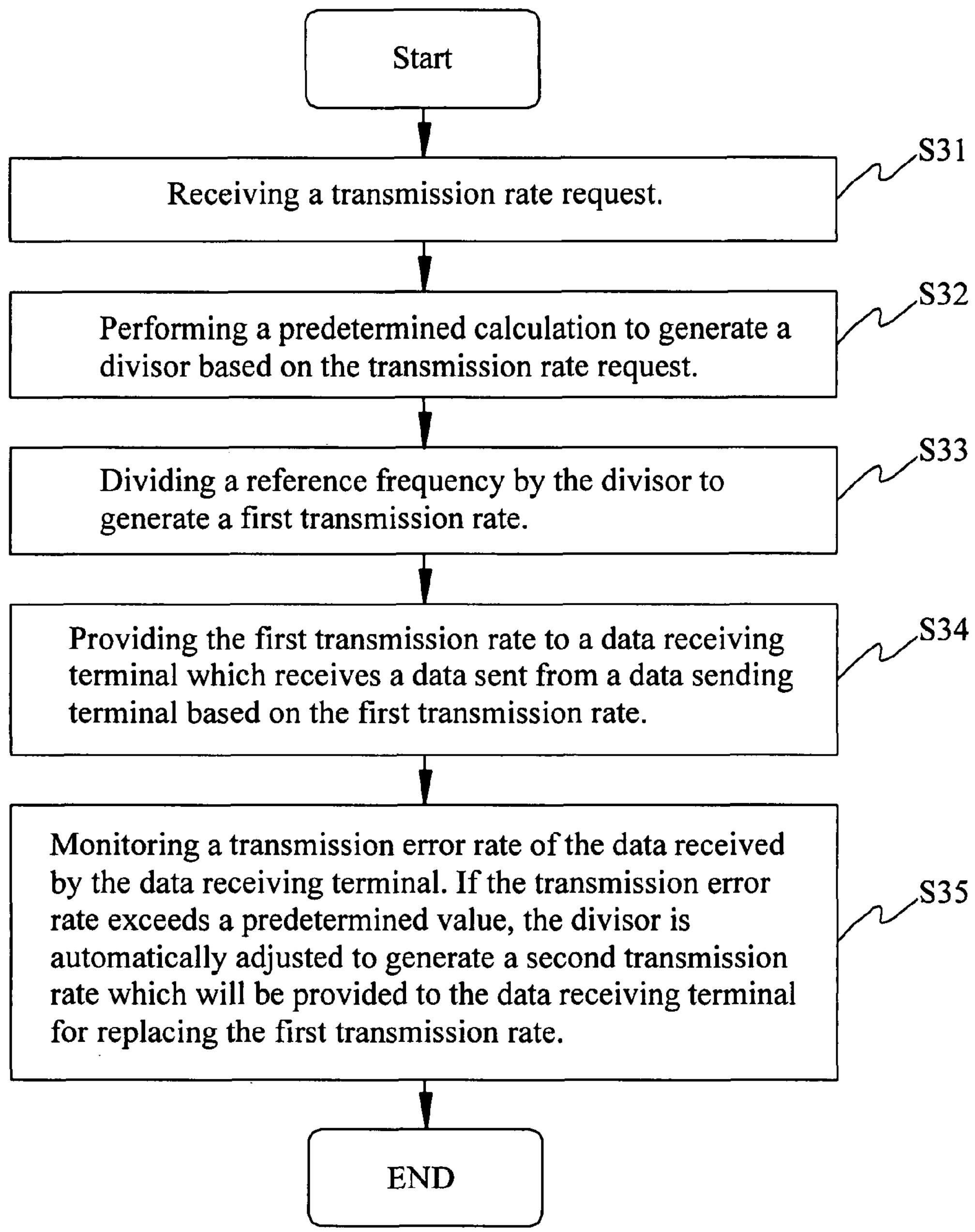
FIG. 3 is the flow chart of the data transmission rate adjustment method in accordance with the invention.

Please referring to FIG. 3 for the flow chart of the data transmission rate adjustment method in accordance with the present invention, the method comprises the following steps:

S31: Receiving a transmission rate request.

S32 Performing a predetermined calculation to generate a divisor based on the transmission rate request.

S33: Dividing a reference frequency by the divisor to generate a first transmission rate.

S34: Providing the first transmission rate to a data receiving terminal which receives a data sent from a data sending terminal based on the first transmission rate. And S35: Monitoring a transmission error rate of the data received by the data receiving terminal. If the transmission error rate exceeds a predetermined value, the divisor is automatically adjusted to generate a second transmission rate which will be provided to the data receiving terminal for replacing the first transmission rate.

Wherein, the reference frequency mentioned above is provided by a CPU. The unit of the first transmission rate and the second transmission rate mentioned above is a baud rate. Preferably, the data receiving terminal mentioned above receives a data by the interface, such as a universal asynchronous receiver transmitter, a universal serial bus, a wireless network transmission interface or any kind of transmission interfaces. Preferably, the transmission error rate mentioned above is the occurred rate of the frame error in the frame received by the data receiving terminal.

Figure 4:
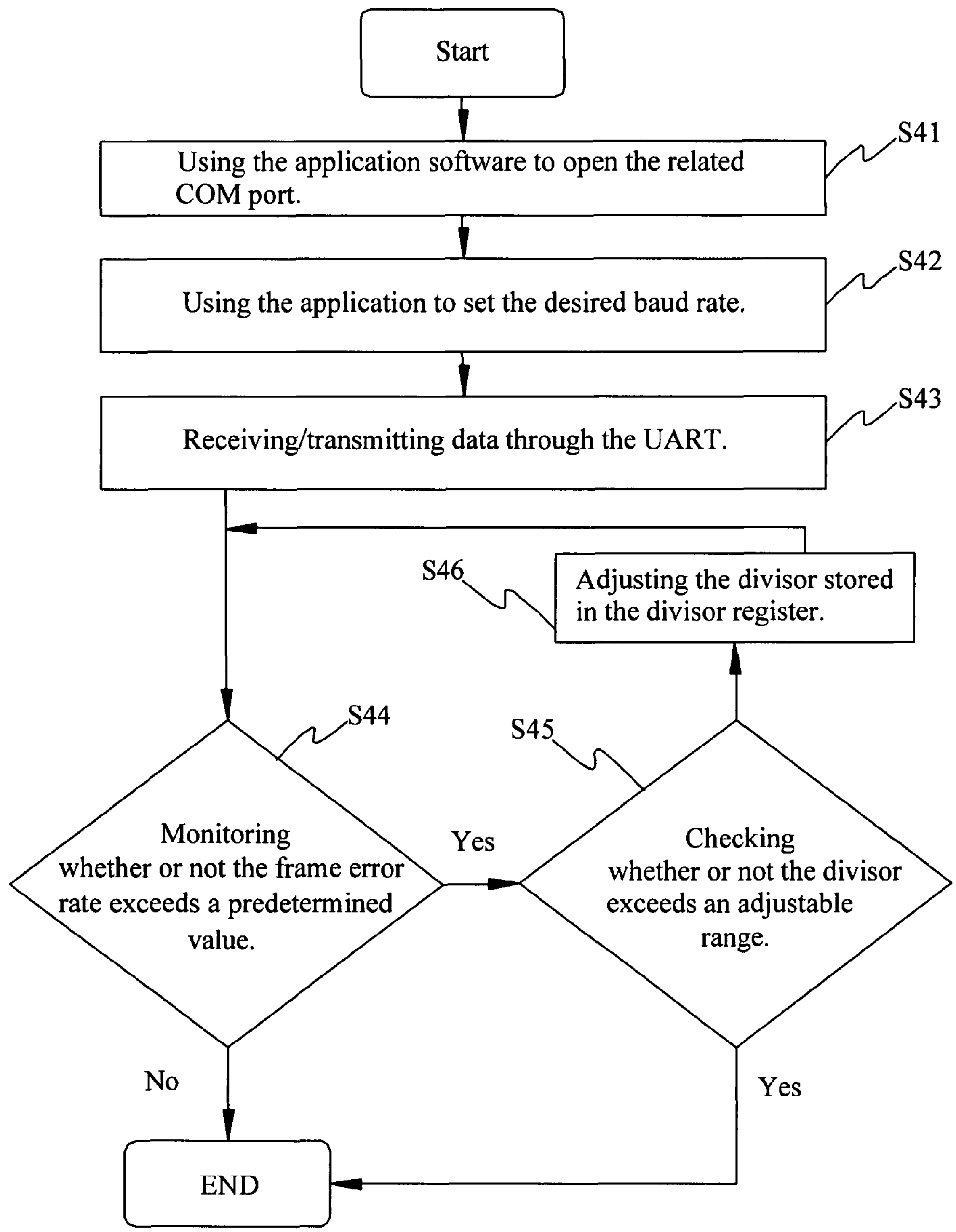
FIG. 4 is the flow chart of an embodiment of the data transmission rate adjustment method in accordance with the invention.

Please referring to FIG. 4 for the flow chart of an embodiment of the data transmission rate adjustment method in accordance with the present invention, the method comprises the following steps:

S41: Using the application software to open the related COM port.

S42: Using the application to set the desired baud rate.

S43: Receiving/transmitting data through the UART.

S44: Monitoring whether or not the frame error rate exceeds a predetermined value.

S45: Checking whether or not the divisor exceeds an adjustable range. And

S46: Adjusting the divisor stored in the divisor register.

A threshold value should be established for adjustment of the divisor. And only if the frame error rate exceeds the predetermined threshold value, the divisor should be adjusted. Besides, the adjustment of the divisor should locate in a reasonable range. If a suitable value of the divisor can't be found in the reasonable range, the root cause of the frame error may not be the shift of baud rate, but the wrong value set by the application software in the top layer of the protocol. Meanwhile, adjustment of the divisor will stop.

While the present invention has been described by way of example and in terms of a preferred embodiment, it is to be understood that the present invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission rate adjustment apparatus applied to a data receiving terminal, and said data transmission rate adjustment apparatus comprising:

a driving module, for performing a predetermined calculation based on a request with an information of desired transmission rate to generate a divisor; and a control module, for dividing a reference frequency by said divisor to generate a first transmission rate so that said data receiving terminal can receive data sent from a data sending terminal through said driving module with said first transmission rate;

wherein said driving module monitors a transmission error rate of said received data and adjusts said divisor if said transmission error rate exceeds a predetermined value, and said control module generates a second transmission rate based on said adjusted divisor, and said data receiving terminal receives data through said driving module with said second transmission rate;

wherein said control module further comprises a status register for storing an operating status of said control module, and said driving module monitors said transmission error rate by checking the data stored in said status register.

2. The data transmission rate adjustment apparatus of claim 1, wherein said reference frequency is provided by a CPU.

3. The data transmission rate adjustment apparatus of claim 1, wherein the unit of said first transmission rate and said second transmission rate is a baud rate.

4. The data transmission rate adjustment apparatus of claim 1, wherein said data receiving terminal receives said data by using a universal asynchronous receiver transmitter (UART), a universal serial bus, a wireless network transmission interface or an any kind of transmission interface.

5. The data transmission rate adjustment apparatus of claim 1, wherein said control module further comprises an UART controller.

6. The data transmission rate adjustment apparatus of claim 1, wherein said control module further comprises a divisor register, said driving module storing said divisor in said divisor register to provide said divisor to said control module for calculating.

7. The data transmission rate adjustment apparatus of claim 1, wherein said transmission error rate is an occurred rate of a data frame error when said data receiving terminal receives data.

8. A data transmission rate adjustment method applied to a data receiving terminal comprising:

receiving a request with an information of desired data transmission rate by a driving module;

performing a predetermined calculation based on said transmission rate request to generate a divisor by said driving module;

dividing a reference frequency by said divisor to generate a first transmission rate by a control module;

providing said first transmission rate by said control module to said data receiving terminal which receives a data sent from a data sending terminal based on said first transmission rate;

monitoring a transmission error rate of said received data by said driving module via checking the data stored in a status register for storing an operating status of said control module;

adjusting said divisor by said driving module and dividing said reference frequency by said adjusted divisor to generate a second transmission rate by said control module if said transmission error rate exceeds a predetermined value; and providing said second transmission rate by said control module to said data receiving terminal for receiving said data with said second transmission rate.

9. The data transmission rate adjustment method of claim 8, wherein said reference frequency is provided by a CPU.

10. The data transmission rate adjustment method of claim 8, wherein the unit of said first transmission rate and said second transmission rate is a baud rate.

11. The data transmission rate adjustment method of claim 8, wherein said data receiving terminal receives said data by using a universal asynchronous receiver transmitter, a universal serial bus, a wireless network transmission interface or any kind of transmission interface.

12. The data transmission rate adjustment method of claim 8, wherein said transmission error rate is an occurred rate of a data frame error when said data receiving terminal receives data.

13. A data transmission rate adjustment apparatus applied to a data receiving terminal, and said data transmission rate adjustment apparatus comprising:

a driving module, for performing a predetermined calculation based on a request with an information of desired transmission rate to generate a divisor; and a control module, for dividing a reference frequency by said divisor to generate a first transmission rate so that said data receiving terminal can receive data sent from a data sending terminal through said driving module with said first transmission rate;

wherein said driving module monitors a transmission error rate of said received data and adjusts said divisor if said transmission error rate exceeds a predetermined value, and said control module generates a second transmission rate based on said adjusted divisor, and said data receiving terminal receives data through said driving module with said second transmission rate;

wherein said control module further comprises a divisor register, said driving module storing said divisor in said divisor register to provide said divisor to said control module for calculating.

* * * * *